3,509,020
METHOD OF FORMING INTEGRAL FIBROUS SHEETS
Fred J. Gelsomino, Buffalo, N.Y., assignor to National Gypsum Company, Buffalo, N.Y., a corporation of Delaware
No Drawing. Filed Dec. 27, 1966, Ser. No. 604,543
Int. Cl. B32b 9/00; D21h 1/02
U.S. Cl. 162—124                    9 Claims

ABSTRACT OF THE DISCLOSURE

A method of obtaining natural bonding of a plurality of fibrous plies into an integral fibrous sheet which is not subject to delamination during handling and/or use. An aqueous solution of a water soluble thickening agent is applied to the surface of the thin fibrous plies and the plies then pressed together. The solution, which is not readily absorbed into the plies, remains at the interface of the plies when they are pressed together to provide natural bonding of the plies.

---

This invention relates to the manufacture of fibrous products. More particularly, it relates to a method of obtaining natural ply bonding in the manufacture of fibrous products formed of a plurality of plies of the fibrous material.

Many fibrous products consist of a plurality of plies of the fibrous material bonded together to form an integral sheet. For example, in the manufacture of cement-fiber sheets on a cylinder type wet machine, a thin wet mat of fibers (such as asbestos fibers) and a cementitious bonding material is formed on the surface of the cylinder screen and transferred to a rotating accumulator roll upon which successive plies of the mats are wound until a sufficient number thereof are obtained to form a laminated sheet of the desired thickness. The laminated sheet is then removed from the accumulator roll, treated to obtain the density and thickness desired in the finished product, and then hardened and cured to obtain desired strength properties. Wet mats of other fibrous materials such as, for example, mineral fibers, cellulose fibers, and the like, are also bonded together by similar techniques in which a plurality of the wet plies are pressed together.

While laminated fibrous sheets formed in such a manner are suitable for use in many applications, they suffer from certain disadvantages which limit their use. Thus in some instances, the sheets tend to delaminate during handling, processing or use, thereby destroying the integral nature of the sheets. This delamination which is due to poor bonding of the plies, occurs primarily with low density fibrous sheets. Bonding of the fibrous plies is achieved by the interlocking of fibers and the flow of bonding media between adjacent plies of the wet mat. Therefore, in order to have good natural bonding of the plies it is necessary that the plies contain a sufficient amount of free water to permit some mobility of the mix when the wet plies are pressed together. This mobility of the mix allows fibers in adjacent plies to interlock and allows flow of the bonding media into adjacent plies, thereby uniting the plies into an integral sheet. However, formulations used in making low density sheets have high water absorption characteristics and require a high water-to-mix ratio in order to provide for such mobility of the mix and permit natural bonding of the plies. The use of such a high water-to-mix ratio, however, results in the formation of a sheet that is too wet and too heavy for use in most commercial operations, for efficient wet machine speeds can not be obtained with the high water content. Conversely, if the water content of the plies is maintained at low values so that high machine speeds can be obtained, the plies are usually too dry to obtain good natural bonding of the plies with the result that the sheets thus formed tend to delaminate, thereby providing a product which is commercially unacceptable.

In order to manufacture such low density fibrous sheets, it has been necessary heretofore to carefully control the water content of the plies with a narrow critical range. That is, the water content had to be maintained at a value above that which facilitated bonding of the plies when pressed together but below that which would unduly limit the wet machine speed. However, manufacture of the fibrous sheets under such conditions is extremely difficult, for it is virtually impossible to accurately control the water content of the plies within this required narrow range in a commercial operation. In order to overcome this problem, it has been suggested to maintain the water content of the plies at a low value in order to achieve high machine speeds and to spray an organic adhesive, such as an acrylic latex, between the plies to effect bonding of the plies. Bonding of the plies in such a manner, however, is undesirable for the bond is artificial since it depends upon the adhesive characteristics of the adhesive used rather than on the natural bonding of the plies. Also, the use of such an adhesive is an expensive factor in the production of the fibrous sheets.

It is, therefore, an object of the invention to provide a method of effecting natural ply bonding in the manufacture of fibrous sheets.

Another object of the invention is to provide a method of bonding a plurality of wet fibrous plies into a integral sheet.

Another object is to provide an integral fibrous sheet formed of a plurality of thin fibrous plies bonded together.

Various other objects and advantages will appear from the following description of the invention and the novel features will be particularly pointed out hereinafter in the claims.

As discussed hereinabove, in order to obtain natural bonding of low density fibrous plies, sufficient water must be available at the interface of adjacent plies to provide movement of the material when the plies are pressed together. This movement of material at the interface permits the plies to integrate, thus forming a natural bond. According to the present invention this is accomplished by forming a plurality of conventional fibrous plies and applying thickened water between the plies just prior to when they are pressed together to form the integral fibrous sheet. Thus, as a thin wet ply is formed on a suitable forming machine, thickened water is applied on the surface of the ply and a second thin wet ply is then pressed against the first ply. The thickened water is not readily absorbed into the fibrous plies, but remains on the surface of the plies until they are pressed together. In this manner the thickened water remains on the surface of the wet fibrous plies a sufficient length of time to provide mobility of the mix at the interface of the plies thereby facilitating interlocking of fibers and the flow of bonding media between adjacent plies. Natural bonding of the plies is thereby effected as the plies are pressed together. Since the thickened water is applied only at the interface of the plies where it is needed to promote natural ply bonding, the total water content of the plies may be maintained at low values so that high wet machine speeds may be obtained. For example, in the formation of low density cement fiber sheets by the Hatschek method, thickened water is applied between the plies as the sheet is being formed on the accumulator roll. Thus, as a ply is wrapped around the accumulator roll, the thickened water is applied, as by spraying, on the surface of the ply and a second ply then wrapped around the rotating accumulator and pressed against the first ply. The thickened water which remains on the surface of the first ply until the second ply is pressed into contact therewith, promotes the natural bonding of these plies. The use of the thickened water in this manner permits the water content of the fibrous plies to be reduced to about 25-50% by weight. This reduction in water content enables the fibrous sheet to be formed at high machine speeds without adversely affecting the bonding of the plies.

As used herein, the term "thickened water" refers to a dilute aqueous solution of a water soluble thickening agent which has a viscosity such that it is not readily absorbed into the fibrous plies, but remains on the surface of the plies until they are pressed together. The viscosity of the solution may vary considerably depending upon the water content of the plies, the density of the fibrous plies, the wet machine speed, etc. However, the viscosity of the thickened water must be sufficient to prevent absorption of the water into the plies until the plies are pressed together, and must not be so great as to prevent uniform application of the thickened water on the surface of the plies. Excellent bonding of fibrous plies has been obtained when the thickened water applied on the surface of the plies had a Brookfield viscosity in the range of between 50 and 5000 centipoises. It is to be understood, however, that the invention is not limited to only the use of water in this viscosity range. The use of the thickened water of this invention to provide natural ply bonding permits the water content of the plies to be reduced considerably, so that high wet machine speeds may be obtained without adversely affecting the integrity or properties of the finished, integral fibrous sheet.

Any conventional water soluble thickening agent which is capable of increasing the viscosity of water to an extent such that the water is not readily absorbed into the fibrous plies but remains on the surface of the plies until they are pressed together, may be used in this invention. Suitable thickening agents include water soluble cellulose derivatives such as methyl cellulose, hydroxyethyl cellulose, sodium carboxymethyl cellulose, hydroxypropyl methyl cellulose, ethyl hydroxy-ethyl cellulose, and the like; polyacrylamides; carboxy vinyl polymers; and the like. When the thickened water is used to promote the natural ply bonding of cement-fiber plies, such as asbestos-cement plies, the thickening agent used must be one which does not adversely affect the hydration of the cement. Thus, natural gums such as guar gum and its derivatives, caraya gum, gum tragacanth, and the like should not be used in conjunction with cement-fiber materials for they adversely affect the hydration of the cement, resulting in poor ply bond strength. Also, when forming sheets of such cement-fiber plies, the thickening agent must be capable of maintaining its viscosity in the high alkaline media.

The amount of thickening agent required to provide the necessary viscosity varies, depending on the particular thickening agent used. This amount can be readily determined. Generally only small amounts of the thickening agent are required to provide the necessary viscosity. For example, a 0.35% solution of a hydroxyethyl cellulose thickening agent has a viscosity of about 75 centipoises, and a 0.3% solution of a carboxy vinyl polymer thickening agent has a Brookfield viscosity of about 4000 centipoises. The use of thickened water according to the present invention in order to obtain natural ply bonding by promoting integration of the plies has no significant adverse effect on the properties of the resulting integral fibrous sheet.

The thickened water may be applied to the surface of the wet fibrous plies by any application method capable of providing a substantially uniform distribution of the thickened water over the surface of the plies. Preferably the thickened water is sprayed on the plies. The rate at which the thickened water is applied should be sufficient to provide a coating of the thickened water over substantially the entire surface of each ply. This rate will, of course, vary depending upon the water content of the plies, the viscosity of the thickened water, the speed of the wet machine, and the like. Excellent bonding of the plies has been obtained when the thickened water was applied at rates between 5 and 30 cc. of thickened water per square foot of fibrous ply. It is to be understood, however, that the invention is not limited to such application rates.

After the thickened water has been applied to the surface of the plies and the plies pressed together to form an integral sheet, the resulting sheets may be processed in the same manner as conventional fibrous sheets made without the use of the thickened water. For example, in the formation of low density cement-fiber sheets by the Hatschek method in which the thickened water is applied as the plies are being wound around the accumulator roll, after the desired sheet thickness has been attained the fibrous sheet is cut from the accumulator roll, dried, pressed to a desired caliper, cut to size, and cured, as by steam curing, to provide an integral, low density cement-fiber sheet which is free from delamination during handling, processing and/or use.

The following preferred embodiments are illustrative of the present invention, but are not intended to limit the invention to the materials, amounts, or conditions set forth therein. All percentages and parts are expressed on a weight basis unless otherwise designated.

EXAMPLE I

Low density cement-fiber sheets, having a density of about 60 pounds per cubic foot, were prepared by the wet (Hatschek) process on a conventional cylinder-type forming machine by introducing an aqueous slurry, having a solids content of about 15% to 25% into the cylinder molds of the machine, the solids content of the slurry consisting of a mixture of Portland cement, finely divided silica, filler, and a mixture of asbestos fibers and cellulose fibers. The slurry was picked up on revolving cylinder screens to form a thin wet mat of the cement-fiber mix, which was then transferred to an endless felt blanket and passed around an accumulator roll. A 0.3% aqueous solution of a high molecular weight carboxyvinyl polymer thickening agent, having a Brookfield viscosity of 4000 centipoises, was sprayed between the plies as the sheet was formed on the accumulator roll, to uniformly distribute the thickened water across the surface of the plies, with the thickened water remaining on the surface of the plies until they were pressed together. Eight to nine plies of the wet cement-fiber mat were wrapped around the accumulator roll, with the accumulator roll pressure being maintained at about 80 p.s.i. The wet laminated sheets were then cut from the accumulator roll, passed through a drier to remove surface moisture, under pressure rollers to press the sheet to a thickness of about 3/8", and were subsequently steam cured by autoclaving in an atmosphere of high pressure saturated steam to cure and harden the sheets. Sheets formed in this manner exhibited good ply adhesion and good sheet integrity.

In order to demonstrate the excellent ply bonding of the cement-fiber sheets formed according to the present invention, the sheets formed as described hereinabove were subjected to ten freeze-thaw cycles while immersed in water. Each cycle consisted of placing the immersed cement-fiber sheets in a freezer at −20° F. for 20 hours.

The sheets, still immersed, were then allowed to thaw for eight hours at room temperature (70°–80° F.) and then placed in the freezer again. This procedure provides a severe test for the determination of ply bonding, for the freeze-thaw cycle tends to delaminate poorly bonded plies. In order to provide a basis for comparison, low density cement-fiber sheets were formed according to the procedure described above with the exception that a latex adhesive, rather than the thickened water, was sprayed on the surface of the plies at the accumulator roll in order to bond the plies together. These adhesive-bonded sheets were formed of the same mix composition as the natural-bonded sheets made using the thickened water. Nine samples of each material were tested.

TABLE I.—NO. OF SAMPLES HAVING MODERATE TO SEVERE DELAMINATION

| Freeze-thaw cycle | Made with thickened water | Made with adhesive |
| --- | --- | --- |
| 1 | None | None |
| 2 | None | None |
| 3 | None | None |
| 4 | None | None |
| 5 | None | 2 |
| 6 | None | 3 |
| 7 | None | 3 |
| 8 | None | 4 |
| 9 | 1 | 5 |
| 10 | 1 | 8 |

The results of this test clearly show that a low density cement-fiber sheet having excellent natural ply bonding and sheet integrity can be formed by the process of the present invention.

EXAMPLE II

In order to demonstrate the effectiveness of other thickening agents in promoting natural ply bonding in the process of the present invention, additional sheets of cement-fiber material were prepared and tested according to the procedure of Example I. The materials used were:

| Sample No. | Thickening agent | Concentration, percent | Brookfield viscosity, cps. | Application rate, cc./sq. ft. |
| --- | --- | --- | --- | --- |
| A | Hydroxypropyl methylcellulose. | 1.25 | 4,000 | 23 |
| B | Hydroxyethyl cellulose. | 1.0 | 2,225 | 23 |
| C | do | 0.67 | 340 | 14 |

After fabrication and curing, the sheets were subjected to freeze-thaw testing as described in Example I. In order to provide a basis for comparison, sheets made of the same formulation and according to the same procedure were made, with the exception that bonding of the plies was effected by the use of a latex adhesive instead of by using thickened water. Eight samples of each material were tested. The results of the tests are reported in Table II.

TABLE II

| Freeze-Thaw Cycle | No. of samples with moderate to severe delamination | | | |
| --- | --- | --- | --- | --- |
| | Sample A | Sample B | Sample C | Latex Adhesive |
| 1 | None | None | None | None |
| 2 | None | None | None | 1 |
| 3 | None | None | None | 1 |
| 4 | 1 | None | None | 6 |
| 5 | 2 | None | None | 8 |

The results of this test clearly show the superior ply bonding obtained according to the process of the present invention.

While the examples have been primarily directed to the use of thickened water in the natural ply bonding of low density asbestos cement sheets, it is to be understood that the invention is not to be limited to such material alone. Rather, the invention is generally applicable in the manufacture of fibrous products in which a plurality of thin fibrous plies are bonded together into an integral sheet. Similarly, while the invention has been described particularly in regards to the formation of a fibrous sheet on a cylinder machine, the invention is suitable for use in other methods of forming an integral fibrous sheet from a plurality of thin fibrous plies.

It is also to be understood that the invention is not limited to the thickening agents, viscosity or application rates set forth in the specific example, for these are intended to be merely illustrative of the invention. Rather, any conventional water soluble thickening agent which is capable of increasing the viscosity of water to the extent that the water is retained on the surface of the plies until the plies are pressed together, and does not adversely affect the components of the fibrous sheet, may be used in the present invention. It will therefore be recognized that the invention is not to be considered as limited to the precise embodiments described, but is to be interpreted as broadly as permitted by the appended claims.

What is claimed is:

1. A method of forming an integral cement-fiber sheet which comprises forming an aqueous slurry of fibers and a cementitious bonding material, forming a plurality of thin cement-fiber plies from said slurry, applying an aqueous solution of a water soluble thickening agent on the surface of said plies, thereby providing mobility of the cement-fiber mix at the surface of the plies, and pressing the plies together to form an integral cement-fiber sheet, whereby said aqueous solution provides natural bonding of the plies.

2. The method as defined in claim 1 in which said aqueous solution of a water soluble thickeneing agent has a viscosity such that the water of said aqueous solution is retained on the surface of the plies until said plies are pressed together.

3. The method as defined in claim 1 in which said plies are formed on a cylinder machine and are pressed together by winding a plurality of plies around an accumulator roll, said aqueous solution being applied to the surface of the plies prior to their being pressed together on the accumulator roll.

4. A method of obtaining natural ply bonding in a fibrous sheet formed of a plurality of fibrous plies, which comprises applying an aqueous solution of a water soluble thickening agent on the surface of said fibrous plies, and pressing the plies together while said aqueous solution remains on the surface of the plies, whereby said aqueous solution probides mobility of the mix at the interface of the plies while the plies are pressed together to provide natural bonding of the plies into an integral sheet.

5. The method as defined in cliam 4 in which said aqueous solution has a viscostiy of about 50 to 5000 centipoises, whereby the water is retained on the surface of the fibrous plies until the plies are pressed together.

6. The method as defined in claim 4 in which said aqueous solution is applied at a rate sufficient to provide a coating of said aqueous solution over substantially the entire surface of each of said fibrous plies.

7. The method as defined in claim 4 in which the plies are formed of a fibrous-cement mix and are formed on a cylinder machine and wound around an accumulator roll to form an integral sheet, said aqueous solution being applied to the surface of the plies prior to their being pressed together on the accmulator roll.

8. The method as defined in claim 7 in which the fibrous cement plies have a water content of about 25% to 50% by weight when said aqueous solution is applied thereto.

9. An integral fibrous sheet formed according to the method of claim 4.

References Cited

UNITED STATES PATENTS 3,344,015  9/1967  Neal et al. _____ 162—154 X

OTHER REFERENCES

Kirk and Othmer, Encyclopedia of Chemical Technology, 2 ed. Interscience, N.Y. (1964), vol. 4, p. 645.

S. LEON BASHORE, Primary Examiner

F. S. FREI, Assistant Examiner

U.S. Cl. X.R.

161—205, 267; 162—132, 133, 154; 156—307